US006470421B1

(12) United States Patent
Bui et al.

(10) Patent No.: US 6,470,421 B1
(45) Date of Patent: Oct. 22, 2002

(54) METHOD AND MEANS FOR REDUCING DEVICE CONTENTION BY RANDOM ACCESSING AND PARTIAL TRACK STAGING OF RECORDS ACCORDING TO A FIRST DASD FORMAT BUT DEVICE MAPPED ACCORDING TO A SECOND DASD FORMAT

(75) Inventors: Thao B. Bui; James C. Chen; Chan Y. Ng, all of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/632,413

(22) Filed: Aug. 4, 2000

Related U.S. Application Data

(63) Continuation of application No. 08/937,423, filed on Sep. 25, 1997, now Pat. No. 6,112,277.

(51) Int. Cl.[7] .............................................. G06F 12/00
(52) U.S. Cl. ........................... 711/114; 711/113; 360/48
(58) Field of Search ........................ 711/112, 111, 114, 711/113, 100; 360/48, 49

(56) References Cited

U.S. PATENT DOCUMENTS

| | | | | |
|---|---|---|---|---|
| 5,301,304 A | * | 4/1994 | Menon | 703/24 |
| 5,335,328 A | * | 8/1994 | Dunn et al. | 360/48 |
| 5,388,013 A | * | 2/1995 | Nakamura | 360/48 |
| 5,459,853 A | * | 10/1995 | Best et al. | 711/114 |
| 5,506,979 A | * | 4/1996 | Menon | 711/112 |
| 5,636,359 A | * | 6/1997 | Beardsley et al. | 711/122 |
| 5,664,144 A | * | 9/1997 | Yanai et al. | 711/113 |
| 5,734,818 A | * | 3/1998 | Kern et al. | 714/20 |
| 5,909,692 A | * | 6/1999 | Yanai et al. | 711/4 |
| 5,951,691 A | * | 9/1999 | Ng et al. | 714/5 |
| 6,009,498 A | * | 12/1999 | Kumasawa et al. | 711/112 |
| 6,041,386 A | * | 3/2000 | Bello | 711/4 |
| 6,041,391 A | * | 3/2000 | Kanda et al. | 711/112 |
| 6,101,574 A | * | 8/2000 | Kumasawa et al. | 711/113 |
| 6,112,277 A | * | 8/2000 | Bui et al. | 711/114 |
| 6,304,940 B1 | * | 10/2001 | Beardsley | 711/112 |
| 2001/0014929 A1 | * | 8/2001 | Taroda et al. | 711/112 |

OTHER PUBLICATIONS

"Complete Track Indication for Increased Count Key Data Emulation Performance", IBM Technical Disclosure Bulletin, vol. 38, pp. 85–86, Jun. 1995.*
"Method to Overcome the Problems of using Fixed Frequency Oscillator to Write Variable Length Data on DASD", IBM Technical Disclosure Bulletin, vol. 38, pp. 283–284, Apr. 1995.*
"Rapid Access Method for Fixed Block DASD Records", IBM Technical Disclosure Bulletin, vol. 20, pp. 1565–1566, Sep. 1977.*
"The RAIDbook, A Source Book For Disk Array Technology," published by The RAID Advisory Board, St.Peter, Minnesota (5th Ed., Feb., 1996), pp. 96–134.*
"Record Caching with Count Key Data Emulation on Fixed Block Architecture Devices," IBM Technical Disclosure Bulletin, vol. 38, No. 06,(Jun. 1995).*

* cited by examiner

Primary Examiner—Matthew Kim
Assistant Examiner—Pierre-Michel Bataille
(74) Attorney, Agent, or Firm—Abdy Raissinia; Esther E. Klein; Douglas R. Millett

(57) ABSTRACT

A staging method and means for both device read and update write operations in which messages and commands between a storage subsystem and a fixed-block formatted RAID array emulating a variable-length record (CKD) formatted device for both read and write operations are evaluated to ascertain whether the record addressing was random and truly in record mode. If they are in that mode, then partial track staging by the RAID array control from the fixed-block formatted HDDs to a subsystem cache or the like would reduce device contention by reading and staging less than full track.

6 Claims, 3 Drawing Sheets

METHOD AND MEANS FOR REDUCING DEVICE CONTENTION BY RANDOM ACCESSING AND PARTIAL TRACK STAGING OF RECORDS ACCORDING TO A FIRST DASD FORMAT BUT DEVICE MAPPED ACCORDING TO A SECOND DASD FORMAT

This application is a continuation of 08/937,423 filed or Sep. 25, 1997, now U.S. Pat. No. 6,112,277.

FIELD OF THE INVENTION

This invention relates to hierarchical, demand/response, disk storage subsystems, and more particularly to a method and means for reducing contention among one or more direct access storage devices (DASDs) in the presence of concurrent accessing of data formatted according to one addressing convention, but formatted and stored across one or more DASDs according to a second convention.

DESCRIPTION OF RELATED ART

In this specification, the acronym DASD signifies a cyclic, multitrack, direct access storage device of large disk diameter and low recording density along any track. Also, HDD is the acronym for high-density disk drives having a relatively small disk diameter with high recording density along any track and a high radial number of tracks. Lastly, the terms "subsystem", "storage control unit", and the IBM 3990 SCU are used interchangeably.

Data Storage Models and Format Conversion at DASD Level

One early storage model of data was denominated CKD. CKD is an acronym for count, key, and data. This is a variable-length record formatting convention used by IBM for DASDs. This convention required a count field defininig the length in bytes of the data recorded in a variable-length data field and a key field avaible for use as a record identifier. In practice, the count field is frequently also used to provide record identification. Each of the fields as recorded was spaced apart by a gap along the DASD track. The gap was designed as a pause interval on the continuously rotating DASD, permitting the system to adjust itself to process the next field. The gaps were occasionally dissimilar in length and also served as a place for inserting metadata That is, the gap between the C and K fields differed from the gap between the K and D fields.

Each CKD-formatted record consisted of at least the fixed-length count field and a variable-length data field. The use of the key field was optional and relegated primarily to sort intensive applications. The records were stored or mapped onto a cylinder (track), head (disk), (sector) addressable group of synchronous and constant speed rotating magnetic disks.

Major operating systems such as the IBM MVS, access methods such as VSAM, and significant amounts of application programming became heavily invested with the CKD data model and the simple cylindrical, physical storage addressing of large diameter disk drives. While some records would be less than a track extent, theoretically other CKD records could span several tracks. However, the advent of virtual memory, demand paging, and page replacement operations between mainframe CPUs, such as the IBM S/370 with MVS OS, and large disk-based storage subsystems, such as the IBM 3390, tended to conform CKD records to approximate a 4-kilobyte page. Relatedly, the typical 3390 recording track could accommodate up to twelve pages or 48 Kbytes+5 Kbytes worth of gaps between the fields within a record and between records.

With the passage of time, the recording densities of disk drives substantially improved and it was economically desirable to map data recorded in one format (CKD) onto a disk drive programmed to record data in another format (fixed-block architecture or FBA). Relatedly, FBA is an acronym for fixed-block architecture. That is, a string of extrinsically formatted information is blocked into a succession of equal-length blocks. One way of ensuring recording synchronism between the formats is to have the initial count field of each new CKD record start on an FBA block boundary. In such a scheme, the last FBA block should be padded out to its block boundary.

Reference should be made to Menon, U.S. Pat. No. 5,301,304, "Emulating Records in One Record Format in Another Record Format", issued Apr. 5, 1994. Menon exemplifies the state of the art in format conversion disclosing an emulation method for rapidly accessing CKD records in which the CKD records are stored on a disk drive in FBA format.

Menon maps CKD to FBA blocks by embedding one or two indicators in the mapped information. The term "mapped information" is consonant with the FBA image of the CKD track. In this regard, an "indicator" is coded information of location displacement or a data attribute with respect to a CKD record being accessed on an FBA-fonnatted device. The indicators permit a general orientation and then a precise location of the head with reference to a record of interest on a given FBA DASD track measured from the index or other benchmark. Thus, when CKD records were written out to the FBA-formatted device, the indicators were placed in the stream. Consequently, when the records had to be accessed and staged for both reading and write updating, the access time or disk latency is perceptibly shortened using the indicators.

Overview of Hierarchical Demand/Response DASD Storage Subsystems

In the period spanning 1970 through 1985, IBM developed large-scale multiprogramming, multitasking computers, S/360 and S/370 running under the MVS operating system. A description of the architecture and that of the attached storage subsystem may be found in Luiz et al., U.S. Pat. No. 4,207,609, "Method and Means for Path Independent Device Reservation and Reconnection in a Multi-CPU and Shared Device Access System", issued Jun. 10, 1980. Such systems were of the hierarchical and demand/responsive type. That is, an application running on the CPU would initiate read and write calls to the operating system. These calls, in turn, were passed to an input/output processor or its virtual equivalent (called a channel) within the CPU. The read or write requests and related accessing information would be passed to an external storage subsystem. The subsystem would responsively give only status (availability, completion, and fault) and pass the requested data to or from the CPU.

The architecture of hierarchical demand/response storage subsystems, such as the IBM 3990/3390 Model 6 and the EMC Symmetrix 5500, is organized around a large cache with a DASD-based backing store. This means that read requests are satisfied from the cache. Where the data or records are not in the subsystem cache, the data satisfing those requests are staged up from the DASDs to the subsystem cache. Write updates result in data being sent from the CPU to the cache or to a separate nonvolatile store (NVS), or both. This is the case with the IBM 3990 Model 6. The cache-stored data is then destaged or written out to the DASDs on a batched basis asynchronous to processing the write requests. Records stored in NVS are destaged only if the modified tracks are not available in cache. In these subsystems, the term "demand/response" connotes that a new request will not be accepted from a higher echelon until the last request is satisfied by a lower echelon, and a positive indication is made by the lower to the higher echelon.

In order to minimize reprogramming costs, applications executing on a CPU (S/390) and the attendant operating system (MVS) would communicate with invariant external storage architecture even though some components may change. Relatedly, the invariant view of storage associated with an MVS operating system required that data be variable-length formatted (CKD) and stored in that CKD format on an external subsystem of attached disk drives (IBM 3390) at addresses identified by their disk drive cylinder, head, and sector location (CCHHSS). Significantly, requested CKD-formatted data is staged and destaged between the CPU and the storage subsystem as so many IBM 3390 disk drive tracks worth of information. One address modification is to use CCHHR, where R is the record number with CC and HH refers to the cylinder and head numbers, respectively.

It is well appreciated that an improved disk storage facility can be attached to a subsystem if the new facility is emulation compatible with the unit it has replaced. Thus, a RAID 5 storage array of small disk drives can be substituted for a large disk drive provided there is electrical and logical interface compatibility. Illustratively, the IBM 3990 Model 6 storage control unit can attach an IBM 9394 RAID 5 array DASD and interact with it as if it were several IBM 3390 large disk drives. Data is staged and destaged to and from the RAID 5 array formatted as CKD-formatted 3390 disk drive tracks. The RAID 5 array in turn will reformat the tracks as one or more fixed-block formatted strings and write them out to disk.

Fast Write and Quick Write

Another significant change was to separately tune the read and write paths to the subsystem-stored data to the patterns of sequential or random accessing. To this extent, the advent of inexpensive semiconductor RAM memory also encouraged the use of RAM for large subsystem buffers/caches. Also, the LRU cache discipline permitted using the caches for tuning of random read referencing. Furthermore, any loss or corruption of data in the subsystem cache could be resolved by merely restaging the CKD tracks containing the data from DASD devices.

The write path required operating the cache in a write-through manner and achieved reliability at the expense of data rate and concurrency. That is, a write operation was not deemed completed unless and until the track had been written out to the DASD backing store or device. In this regard, reference should be made to Beardsley et. al., U.S. Pat. No. 4,916,605, "Fast Write Operations", issued Apr. 10, 1990. Beardsley disclosed the use of a subsystem level nonvolatile store (NVS) for buffering the results of the write update processing, thereby permitting the subsystem to signal write completion to the host and to asynchronously schedule any destaging of the updated CKD records to the DASDs.

It has been recognized that each write update operation involves (a) reading one or more records from DASD into the subsystem buffer/cache, (b) logically combining or replacing some portion of the record with the update received from the host, and (c) writing one or more modified records out to the DASD as a track overwrite. Most schemes presuppose an update in place. That is, the modified record replaces the original at the same DASD location.

There are several problems. First, in the case of CKD-formatted records, the CKD track is the unit of staging and destaging. As previously mentioned, a CKD track nominally contains up to 12 CKD-formatted 4 Kbyte records for a length including gaps of 54 Kbytes. Such a unit of staging is arbitrary, especially where high-density FBA-formatted DASD tracks can hold several CKD-formatted tracks. Second, there are many instances where only one or a few records on the same or different CKD tracks are to be updated during a write operation. Notwithstanding, the entire track containing the record is staged. This occupies significant subsystem processing resource and time.

Reference is now made to Benhase et. al., U.S. Pat. No. 5,535,372, "Method and Apparatus for Efficient Updating of CKD Data Stored on Fixed Block Architecture Devices", issued Jul. 9, 1996. Benhase modified Beardsley's "fast write" and focused upon efficiency in the use of subsystem cache and NVS resources. That is, Benhase substituted descriptors of certain types of tracks in cache as a type index rather than keeping the tracks themselves subsystem cache resident. When the host required an update write, the subsystem determined whether the requested record was of the preferred type. If so, it signaled the host that the update has been completed. It then computed a partial track containing the record or records and staged them from DASD to the subsystem cache. Otherwise, the whole track would be staged.

The descriptors in Benhase covered predefined-type tracks and those tracks which were "well behaved". Parenthetically, a "well behaved" CKD track was one containing equal-length CKD records and one in which the record IDs were monotonically numbered and nondiminishing. After the track or partial track was staged to subsystem cache, it was overlaid with the changed record or records. It was then placed in the NVS for asynchronous writing out to the DASD in place. As Benhase points out, cache space is saved, fast write operations are extended to tracks not physically in cache, and records can be located without having to stage the entire track to subsystem cache.

Fixed-block Formatted RAID 5 DASD Array as a Fault-tolerant CKD DASD Reference is made to Clark et. al., U.S. Pat. No. 4,761,785, "Parity Spreading to Enhance Storage Access", issued Aug. 2, 1988. Clark disclosed an array of N+1 disk drives accessed by way of a CPU acting as a subsystem storage control unit including cache and buffering. Data in the form of N+1 blocks per logical track was mapped onto the N+1 DASDs. Each logical track consisted of N fixed-length data blocks and their parity image block. The data were written to counterpart ones of the DASDs such that no single DASD contained two blocks from the same logical track, and no single DASD contained all the parity blocks. Indeed, Clark actually spread the parity images in round-robin fashion among the N+1 DASDs.

Of course. there are many ways to paint the devices with logical blocks. Suppose it was desired to write out a CKD cylinder of tracks consisting of some predetermined number of CKD tracks' worth of records upon an IBM 3390 DASD. Further, suppose that the 3390 DASD was being emulated by a RAID 5 array formed from four high-density disk drives (HDDs). If the tracks were written out in the manner of the Clark patent, then a CKD cylinder could be mapped to the RAID 5 array of HDDs as follows:

| HDD1 | HDD2 | HDD3 | HDD4 |
|---|---|---|---|
| CKD track 1 | CKD track 2 | CKD track 3 | Parity image of tracks 1, 2, and 3 |
| Parity image of tracks 4, 5, and 6 | CKD track 4 | CKD track 5 | CKD track 6 |
| CKD track 9 | Parity image of tracks 7, 8, and 9 | CKD track 7 | CKD track 8 |

Contemporary RAID 5 arrays include a predetermined number of spares in the event that one of the active DASDs fails. When the subsystem control unit passes a staging request, it is in the form of so many CKD tracks and there is device contention in accessing blocks and staging them to the RAID 5 cache/buffer. When a device fails, the same information in whole or in part must be recreated from fewer devices to satisfy read and update write requests as well as to write a copy of the pertinent data to the spare HDD on either a scheduled or opportunistic basis. This exacerbates device contention where, as here, the tracks of several CKD volumes are written across several HDDs.

SUMMARY OF THE INVENTION

It is an object of the invention to devise a storage subsystem method and means for staging and destaging partial tracks of variable-length formatted (CKD) records from and to devices storing the records according to a fixed-block (FBA) convention, the staging being to a subsystem cache or buffer in satisfaction of read and write update requests.

It is another object to devise a storage subsystem method and means to stage only a partial CKD track spanning CKD-requested records without staging the remainder of the CKD track where the operating mode (full track or record) is determinable from the stream of access requests.

It is a related object to devise such a method or means where a cyclic, multitracked storage device or devices comprise one or more RAID 5 arrays of high-density disk drives storing information according to an FBA convention, but emulating one or more CKD-formatted disk drives or DASDs.

It is yet another related object that such method or means be operable even where a RAID 5 array of HDDs emulating a CKD DASD is operating in a fault-degraded mode.

It was unexpectedly observed that if the messages and commands between a storage subsystem and a RAID array emulating a CKD-formatted device for both read and write operations were evaluated to ascertain whether the record addressing was random and truly in record mode, then partial track staging by the array control from the fixed-block formatted HDDs to a subsystem cache or the like would reduce device contention by reading and staging less than a full track.

More particularly, the foregoing objects are satisfied by a method and means for reducing device contention in an array of fixed-block formatted disk drives (HDDs) coupling a storage subsystem. The subsystem includes a cache and logic responsive to external commands for writing onto or reading variable-length objects to or from the HDDs. The objects are expressed as cylindrically addressable, sector-organized tracks of variable-length formatted (CKD) records. The logic also forms parity images of predetermined ones of said CKD tracks and writes both the record and image tracks on the HDDs in round-robin order until the cylinder of addresses is exhausted.

Significantly, the method and means of the invention comprise the steps of ascertaining whether any tracks and parameters specified in any of the external access commands are indicative of either a full CKD track operation, span more than a single CKD track, or are sequential operations. Next, each external command is interpreted as to whether or not they are indicative. That is, if the command is neither a full track operation, treats records spanning more than a CKD track, nor forms part of a sequential referencing process, then the CKD sector address range of the command is converted into a fixed-block address range defining a partial CKD track inclusive of the first data byte of the starting CKD sector and the last data byte of the last CKD sector. However, if the command is one of the aforementioned types, then the CKD sector address range of the command is converted into a fixed-block address range defining full CKD tracks. Lastly, the subsystem accesses the fixed blocks in the converted range from the counterpart HDDs in the array and stages the accessed blocks as either a partial or full CKD track or tracks to the subsystem.

It has frequently been the practice to first condition a subsystem and a storage device by sending preliminary or conditioning commands in which the address range of subsequent commands is set out. Illustratively, in CKD-formatted records, accessing an IBM CPU running under MVS will send a Define Extent and Locate Record CCW to the IBM 3990/3390 storage subsystem. In turn, the 3990 storage control unit will send a Set Domain message to a RAMAC array emulating one or more IBM 3390 DASDs. If the Set Domain message sent by the 3990 to the RAMAC drawer logic recites a starting and ending CKD sector and track addresses, and if the parameters in that message also show that absence of all of the following:

(1) format intent (full CKD track write operation), (2) the access request spans more than one CKD track, and (3) sequential operation, then the RAMAC will convert the range, including starting and ending CKD sector addresses, into a range of FRA block addresses where the first fixed block contains at least the first data byte of the starting CKD sector and the last fixed block contains at least the last data byte of the last CKD sector and stage the partial track. Otherwise, the RAMAC stages full CKD tracks.

DESCRIPTION OF THE PREFERRED EMBODIMENT

Figure 1:
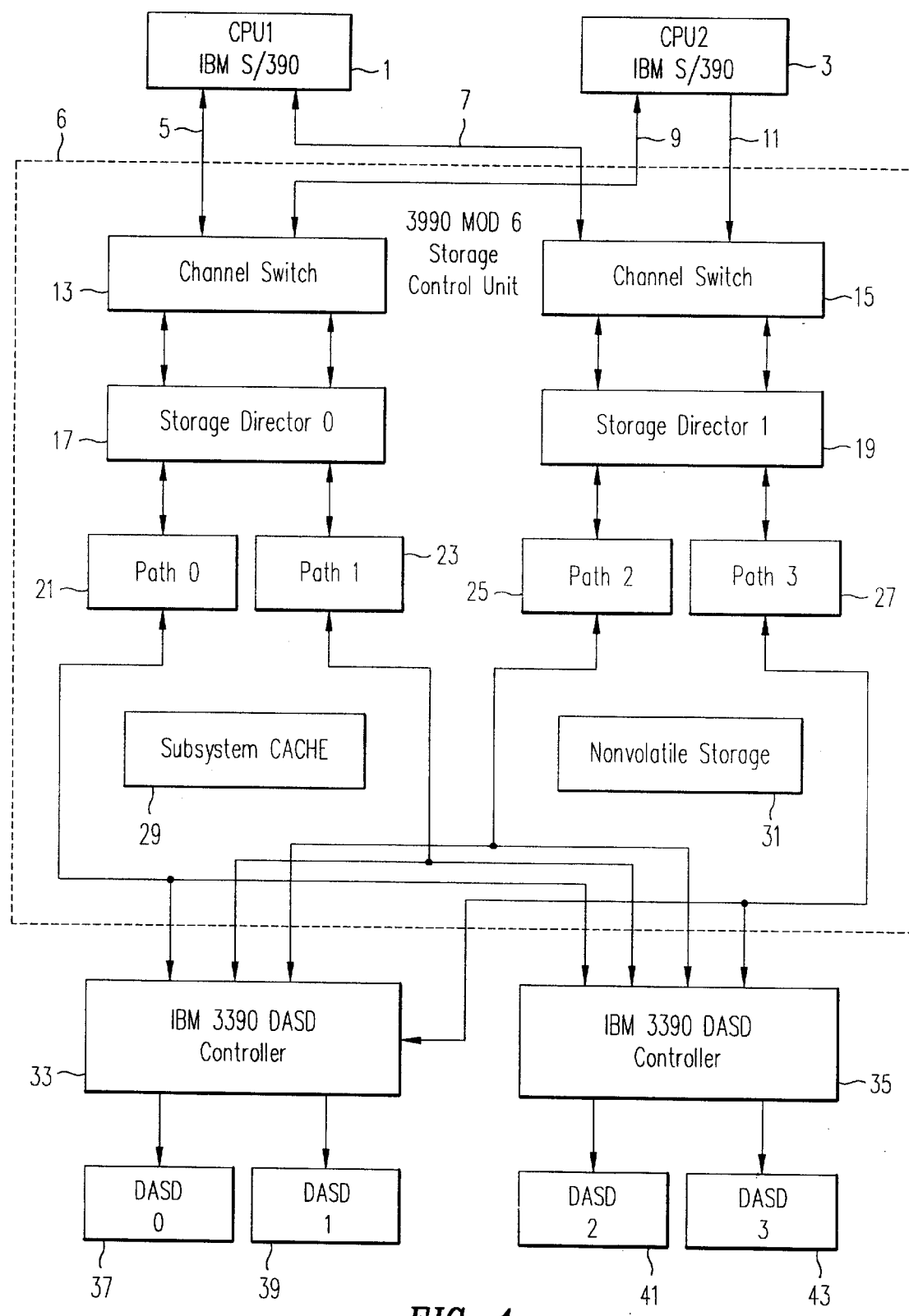
FIG. 1 shows a logical block diagram of an IBM 3990/3390 illustrative of a hierarchical, demand/responsive storage subsystem.

Referring now to FIG. 1, there is shown a functional block diagram depiction of the IBM 3990/3390 disk storage subsystem exemplifying a host-attached, hierarchical, demand/response storage subsystem. This subsystem is shown driven from first and second multiprogramming, multitasking hosts CPU 1 and 2 such as an IBM System/390 running under the IBM MVS operating system. The subsystem is designed such that data stored on any of the DASD storage devices 37, 39, 41, and 43 can be accessed over any one of at least two failure-independent paths from either one of the CPUs 1 or 2, although the system as shown provides four failure-independent paths. Illustratively, data on devices 37 or 39 can be reached via 3390 controller 33 over any one of paths 21, 23, 25, or 27. The same holds for data stored on devices 41 or 43 via controller 35. A full description of this principle is to be found in the aforementioned Luiz et. al. patent, herein incorporated by reference.

The 3990 storage control unit consists of at least two storage directors 17 and 19. These are microprocessors and attendant local memory and related circuitry (not shown) for interpreting control information and data from the CPUs, establishing logical and physical paths to the storage devices, and managing fault and data recovery at the subsystem level. The read and write transfer directions are separately tuned. That is, read referencing is first made to cache 29. Any read misses cause data tracks to be staged from the devices as backing stores. Write referencing either as a format write or an update write is made in the form of CKD track transfers from the host to the subsystem cache 29 with a copy of any modified records or tracks being also made to a nonvolatile store (NVS) 31. Any write-modified CKD track or tracks are destaged to the devices through their sundry controllers from the cache 29 or copies thereof from the NVS 31 in the event that the cache-stored originals are not available.

Typically, an application executing on a host 1 or 2 requests to read a file, write a file, or update a file. These files are ordinarily stored on a large bulk 3990/3390 DASD storage subsystem 6. The MVS host (S/390) is responsive to any read or write call from the application by invoking an access method. An access method, such as VSAM, is a portion of the operating system (OS) for forming an encapsulated message containing any requested action. This message is sent to an input/output (I/O) portion of the host and ultimately the storage subsystem. Typically, the message includes the storage action desired, the storage location, and the data object and descriptor, if any. This "message" is turned over to a virtual processor (denominated a logical channel).

The function of the logical channel is to send the message to the storage subsystem over a physical path connection (channels 5, 7, 9, 11). The storage subsystem control logic (director 17 or 19) then interprets the commands. First, a path to the designated storage device is established. Second, the commands are interpreted and any data objects are passed to the storage device location on a real-time or deferred basis. The sequence of commands is denominated as "channel command words" (CCWs). It should be appreciated that the storage device may be either "logical" or "real". If the device is "logical", then device logic at the interface will map the access commands and the data object into a form consistent with the arrangement of real devices. Thus, as mentioned before, a RAID 5 array of HDDs substitutes for one or more IBM 3390 large DASDs.

Referring again to the system shown in FIG. 1, it is the case that the "access method" portion of the MVS operating system, when processing data objects in the form of variable-length CKD records, also will ascertain either a "new address" or an old (update in place) address. The access method assumes that external storage includes actual physical CKD-formatted DASDs or other devices. It generates CKD addresses on a DASD device, cylinder, head, and record (CCHHRR) basis. Significantly, the data objects are ordinarily aggregated on a 3380/3390 DASD track basis. That is, when an application requests one or more records, the access method determines what would be an efficient unit of staging, i.e., record staging or track staging between the S/390 and the 3990 SCU. Accordingly, the access method modifies the CCW chain and address extent occasionally from a track to a record. In turn, the logical channel will cause a string of CCWs, together with "track-formatted" data, to be destaged to a 3990 storage control unit (SCU).

An IBM 3990 storage control unit (SCU) "interprets" the CCWs and batches the writes in the subsystem cache 29 with copies sent to the nonvolatile store 31 (NV write buffer). The updates are sent from the cache or are unavailable from the NVS 31 for later destaging to one or more 3390 logical or physical DASDs 37,39,41, and 43. If a track is written out to a real 3390 DASD, then it will perform ECC processing as discussed subsequently. It should be noted that originally an access method comprised a set of protocols for moving data between a host main memory and physical input/output devices. However, today it is merely a mapping to a logical view of storage, some of which may be physical storage.

Figure 2:
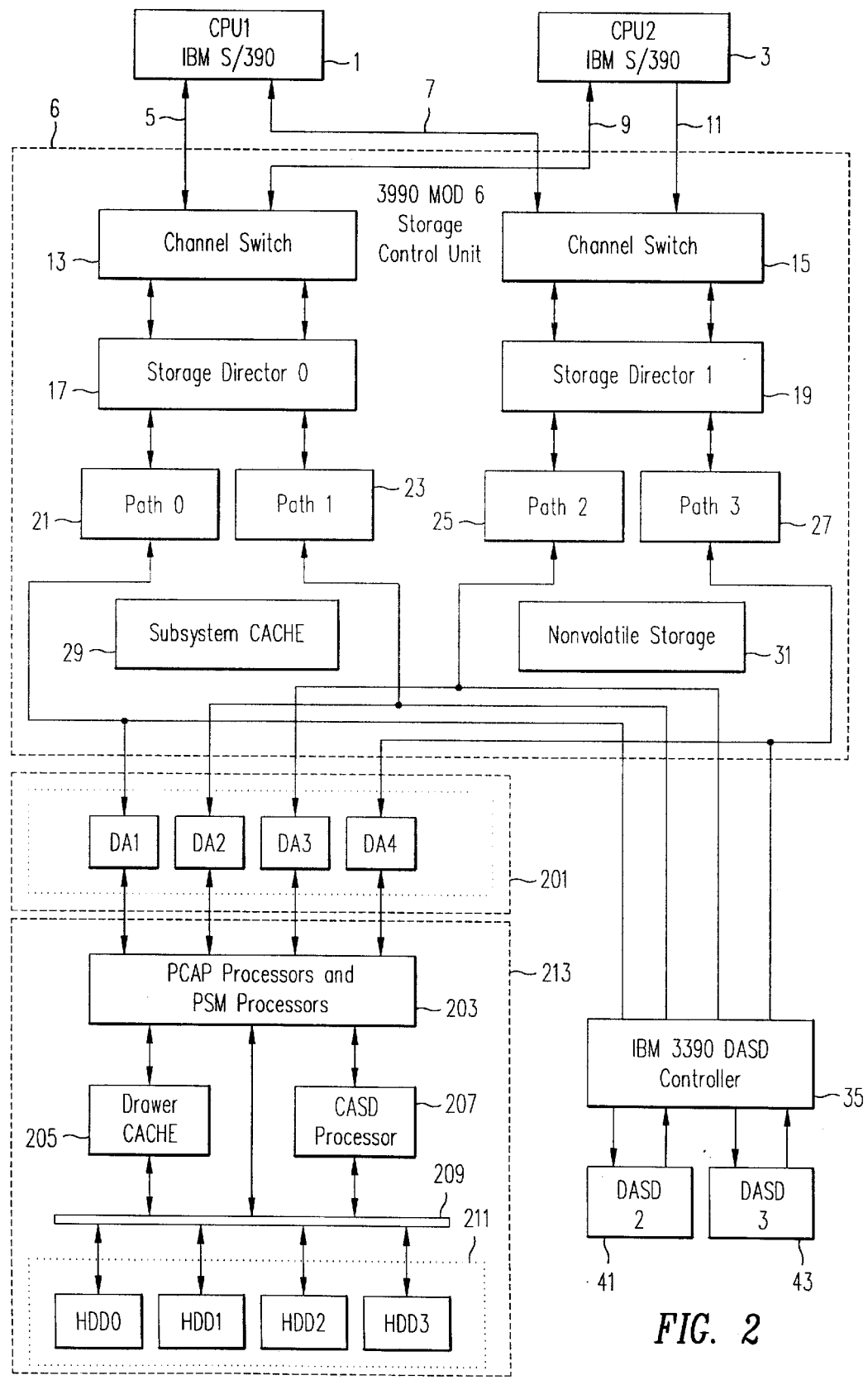
FIG. 2 depicts the subsystem of FIG. 1 but is modified to set out the attachment of a RAID 5 DASD array as a logical 3390 DASD in addition to the attachment of real 3390 DASDs.

Referring now to FIG. 2, there is depicted a RAID 5 array 213 of small DASDs 21 lattached to the control logic 17, 19 of the IBM 3990 storage control unit 6 over the plurality of paths 21, 23, 25, and 27 via device adapters (DAs) 201. One implementation of RAID 5 arrays is to be found in the IBM RAMAC array DASD attaching one or more Enterprise System (S/390) ECKD channels through an IBM 3990 Model 3 or 6 storage control unit. The RAMAC array DASD comprises a rack with a capacity between 2–16 drawers. Each drawer 213 includes four disk drives HDD0-HDD3, cooling fans, control processor 207, ancillary processors 203, and a nonvolatile drawer cache 205. It is configured as a track staging/destaging to three DASDs' worth of data space and one DASD's worth of parity in a RAID 5 DASD array. Each drawer emulates between 2–8 IBM 3390 Model 3 volumes.

Functionally, the DAs 201 provide electrical and signal coupling between the control logic 17 and 19 and one or more RAID 5 drawers. As tracks are staged and destaged through this interface, they are converted from variable-length CKD format to fixed-block length FBA format by the ancillary processors 203. Id this regard, drawer cache 205 is the primary assembly and disassembly point for the blocking and reblocking of data, the computation of a parity block, and the reconstruction of blocks from an unavailable array DASD. A typical configuration would consist of several drawers, such as drawer 213. An additional drawer (not shown) would include four HDDs operable as "hot spares". This is an alternative to siting a "hot spare" within each of the operational drawers.

In this embodiment, four DASDs are used for storing parity groups. If a dynamic (hot) sparing feature is used, then the spare must be defined or configured a priori in the spare drawer. Space among the four operational array devices is distributed such that there exist three DASDs' worth of data space and one DASD's worth of parity space. It should be pointed out that the HDDs 211, the cache 205, and the processors 203 and 207 communicate over an SCSI-managed bus 209. Thus, the accessing and movement of data across the bus between the HDDs 211 and the cache 205 is closer to an asynchronous message-type interface. A typical layout of CKD tracks and parity images of groups of CKD tracks over the HDDs follows the pattern described in the description of the prior art with reference to the Clark patent.

In the CKD storage model, referencing consists of read and update write requests. In both, a CKD track or partial track may be staged. However, in the update write, the modified records resident in the subsystem cache 29 are logically combined, replacing the original counterpart records and written back out through NVS 31 to effect an update in place. In addition to the staging of information, there are the delays associated with device contention. These arise out of the fact that if application 1 stages n times, the information that is used as excess, then it will impose a delay or busy state when application 2 accesses the same device or set of devices. Thus, the extra staging also affects concurrency. Devices or processes concurrently actuating the same resort are said to be in "contention". This becomes exacerbated when one HMD has failed in a RAID 5 array 213, and it is necessary to reconstruct the data from the remaining HDDs 211 either for progressively reconstituting a spare HDD brought on line or for satisfying an access request.

Ordinarily, the CKD command set indicates that the staging mode to be used is either fill track or partial track from DASD, to and from subsystem cache 29, or NVS fast write 31. In the CKD format for the IBM 3390 DASD, there are 224 logical sectors per CKD logical track. The CKD read command specifies a target (beginning) sector and the number of tracks to be staged up. In this invention, this CKD command is interpreted by the RAMAC drawer as consisting of a target sector and a last or final sector.

Suppose the CPU host 1 or 2 sends a CKD CCW requesting to update records 2, 3, and 4 on CKD logical track 19 to the subsystem 6 (IBM 3990 SCU). The subsystem 6 ascertains that the requested records occupy a partial CKD track. The subsystem 6 in turn now sends a Set Domain message or command to the RAMAC drawer 213. The question arises as to how the subsystem 6 knows-that it should operate in a partial-track staging mode, i.e., (a) "record mode" or (b) "record-caching mode".

This is resolved by a provision in the CKD architecture that the host sends a Define Extent CCW and Record Locate CCW. These CCWs specify that read-accesses within the defined address range are to be made in "record mode". In "record mode", a single record read access is made of individual records by the staging of a single CKD track. Historically, it was possible for CKD-formatted records to span two or more CKD tracks. However, as explained previously in the description of the prior art, since CKD records tend to be synonymous with a 4 K byte page and the track has been "frozen" in the order of 12 page sectors plus gaps, then a CKD track is "sized" at approximately 53 Kbytes. Thus, operating in record mode means staging a single CKD track from an IBM 3390 DASD such as FIG. 2, DASDs 213, 41, or 43 to the subsystem cache 29.

For purposes of completeness, there is a "record-caching mode" as exemplified by a "quick write" variation of the fast write. This is described in the Benhase patent. In record cache mode, a single record write is executed. This is sometimes called "predictive write". The records are of the same or equal size and in nondiminishing monotonic record number order.

Figure 3:
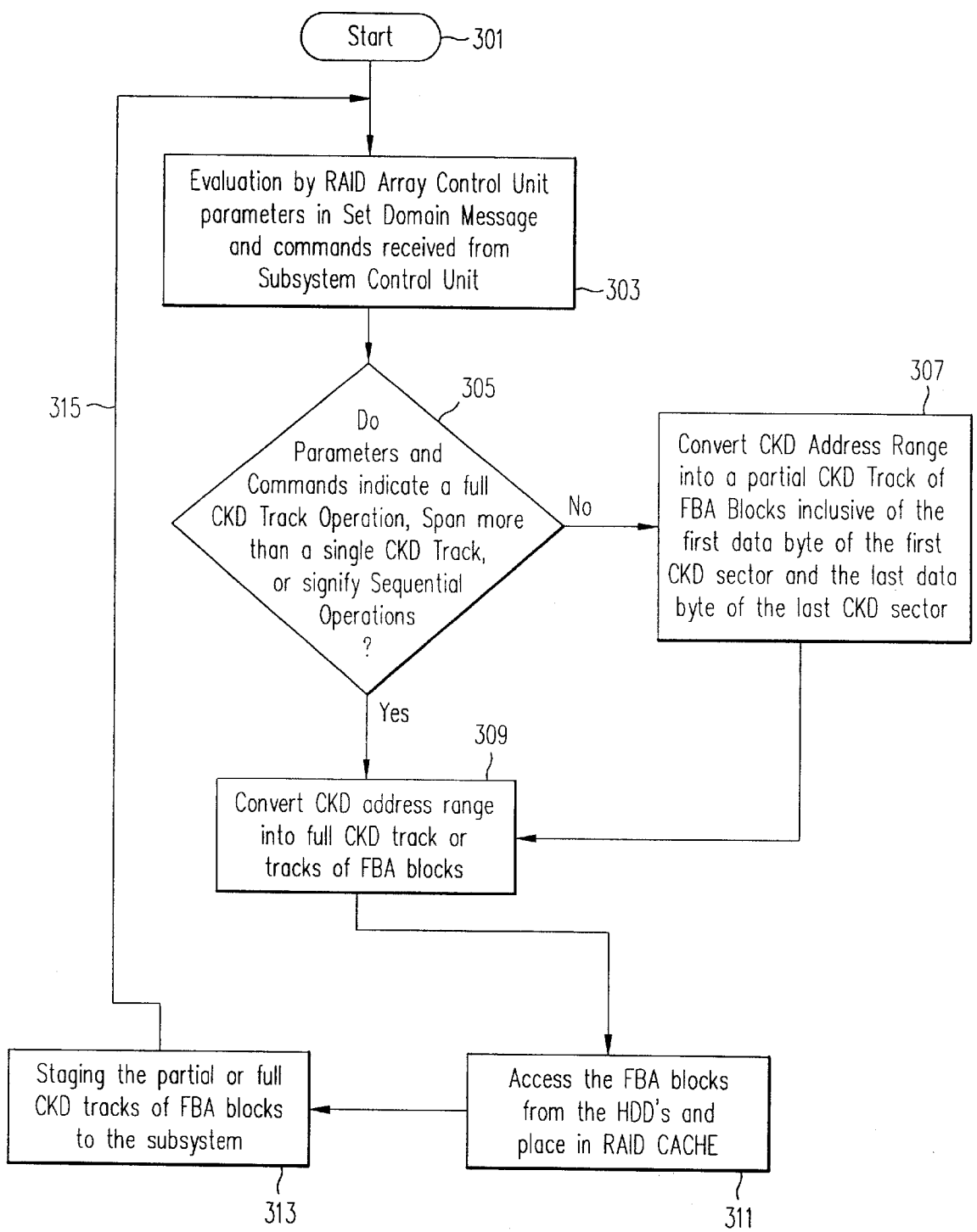
FIG. 3 represents a flow of control of the method of the invention.

Referring now to FIG. 3 taken together with FIG. 2, there is, shown the method of this invention After the subsystem 6 and the attached devices have been configured and initialized in step 301, the method requires the subsystem 6 to recognize that a particular CCW access is in the "record or single track mode" or in the "record-caching mode". An operationally significant restatement of this is for the RAID controller 207 to test whether the parameters in the Set Domain message and the access commands indicate a "full track operation", call for CKD records spanning more than a single CKD track, or signify sequential accessing. This is provided in steps 303 and 305.

If the conditions tested in the Set Domain message and the access commands are negative, then the RAID controller in step 307 converts the CKD address range into a partial CKD track formed from counterpart FBA blocks which span the CKD starting sector and last CKD sector containing the requested data. On the other hand, if any one of the conditions specified in step 305 is positive, then the RAID controller in step 309 converts the CKD sector address range into full CKD track or tracks of counterpart FBA blocks. The required FBA blocks are accessed from the HDDs 211 and assembled into either a counterpart partial CKD track or one or more full CKD tracks in RAID cache 205 in step 311. Lastly, the assembled partial or full track is staged from the RAID cache 205 to the subsystem cache 29 over the appropriate interfaces.

While the invention has been described with respect to an illustrative embodiment thereof, it will be understood that various changes may be made in the method and means herein described without departing from the scope and teaching of the invention. Accordingly, the described embodiment is to be considered merely. exemplary and the invention is not to be limited except as specified in the attached claims.

What is claimed is:

1. In a subsystem including access means responsive to external commands for writing onto or reading cylindrically addressable, sector-organized tracks of variable-length formatted (CKD) records including parity images of predetermined ones of said CKD tracks from an array of fixed block formatted, multitracked disk drives (HDDs), said access means including means for writing said CKD record and parity image tracks on the HDDs in a predetermined order until the cylinder of addresses is exhausted, whereby the subsystem further comprises:

(a) means for ascertaining whether any tracks and parameters specified in any external commands are indicative of either a full CKD track operation, span more than a single CKD track, or sequential operations;

(b) means for interpreting each access command by either (i) converting the CKD sector address range into a fixed-block address range defining a partial CKD track inclusive of the first data byte of the starting CKD sector and the last data byte of the last CKD sector in the event that the tracks and parameters specified in the access commands are not indicative of either a full CKD track operation, span more than a single CKD track, or sequential operations, or (ii) converting the CKD sector address range into a fixed-block address range defining full CKD tracks; and (c) means for accessing the fixed blocks in the converted range from the counterpart HDDs in the array, and for staging the accessed blocks as either a partial or full CKD track or tracks to the subsystem,
wherein the array of HDDs is organized and operated as a RAID 5 array of HDDS, and further wherein the predetermined order for causing the CKD tracks and parity images to be stored on the HDDs is a round robin order, and still further wherein the recording capacity of each HDD track exceeds the byte length of any track of CKD-formatted records in the cylinder.

2. In the subsystem according to claim 1, wherein said access means include means for causing each of the variable-length formatted records to span an equal fixed predetermined number of bytes.

3. A method for reducing device contention in an array of fixed-block formatted disk drives (HDDs) coupling a storage subsystem, said subsystem including means responsive to external commands for writing or reading variable-length formatted (CKD) records to and from said HDDs, the commands designating cylindrically addressable, sector-organized tracks of CKD records, said writing and reading means including means for forming parity images of predetermined ones of said CKD tracks, and means for causing said CKD tracks and parity images to be stored on the HDDs in a predetermined order until the cylinder of addresses is exhausted, said method comprising the steps of (a) ascertaining whether any tracks and parameters specified in any external access commands being applied to said array through said subsystem are indicative of either a full CKD track operation, span more than a single CKD track, or sequential operations;

(b) interpreting each access command by either, (i) converting the CKD sector address range into a fixed-block address range defining a partial CKD track inclusive of the first data byte of the starting CKD sector and the last data byte of the last CKD sector in the event that the tracks and parameters specified in the access commands are not indicative of either a full CKD track operation, span more than a single CKD track, or sequential operations, or (ii) converting the CKD sector address range into a fixed-block address range defining full CKD tracks; and (c) accessing the fixed blocks in the converted range from the counterpart HDDs in the array, and staging the accessed blocks as either a partial or full CKD track or tracks to the subsystem, wherein the array of HDDs is organized and operated as a RAID 5 array of HDDS, and further wherein the predetermined order for causing the CKD tracks and parity images to be stored on the HDDs is a round robin order, and still further wherein the recording capacity of each HDD track exceeds the byte length of any track of CKD-formatted records in the cylinder.

4. The method according to claim 3, wherein the variable length formatted records are each constrained to span an equal fixed predetermined number of bytes.

5. An article of manufacture comprising a machine-readable memory having stored therein indicia of a plurality of processor-executable control program steps for reducing device contention in an array of fixed-block formatted disk drives (HDDs) coupling a storage subsystem, said subsystem including means responsive to external commands for writing onto or reading from said HDDs' cylindrically addressable, sector-organized tracks of variable-length formatted (CKD) records including parity images of predetermined ones of said CKD tracks in predetermined order until the cylinder of addresses is exhausted, said indicia of the plurality of control program steps executable at the subsystem include:

(a) indicia of a control program step for ascertaining whether any tracks and parameters specified in any external access commands are indicative of either a full CKD track operation, span more than a single CKD track, or sequential operations;

(b) indicia of a control program step for interpreting each access command by either (i) converting the CKD sector address range into a fixed-block address range defining a partial CKD track inclusive of the first data byte of the starting CKD sector and the last data byte of the last CKD sector in the event that the tracks and parameters specified in the access commands are not indicative of either a full CKD track operation, span more than a single CKD track, or sequential operations, or (ii) converting the CKD sector address range into a fixed-block address range defining full CKD tracks; and (c) indicia of a control program step for accessing the fixed blocks in the converted range from the counterpart HDDs in the array, and staging the accessed blocks as either a partial or full CKD track or tracks to the subsystems, wherein the array of HDDs is organized and operated as a RAID 5 array of HDDs, and further wherein the predetermined order for causing the CKD tracks and parity images to be stored on the HDDs is a round robin order, and still further wherein the recording capacity of each HDD track exceeds the byte length of any track of CKD-formatted records in the cylinder.

6. The article of claim 5, wherein the variable-length formatted records are each constrained to span an equal fixed predetermined number of bytes.

* * * * *